(12) United States Patent
Shetti et al.

(10) Patent No.: US 11,480,079 B2
(45) Date of Patent: Oct. 25, 2022

(54) SYSTEMS AND METHODS FOR ENGINE COALESCER EXHAUST EXTRACTION

(71) Applicant: Transportation IP Holdings, LLC, Norwalk, CT (US)

(72) Inventors: Ramprasad Shetti, Bangalore (IN); Roshan Kotian, Erie, PA (US); Stephen Kocienski, Fort Worth, TX (US); Jason Lymangrover, Harborcreek, PA (US); Marc Peoples, Volant, PA (US); David Wright, Fort Worth, TX (US); Balaji Hosadurgam Ravindranath, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/445,703

(22) Filed: Aug. 23, 2021

(65) Prior Publication Data

US 2022/0065143 A1   Mar. 3, 2022

Related U.S. Application Data

(60) Provisional application No. 63/069,980, filed on Aug. 25, 2020.

(51) Int. Cl.
*F01M 13/04* (2006.01)
*F01M 13/02* (2006.01)
*B01D 46/00* (2022.01)

(52) U.S. Cl.
CPC ........... *F01M 13/04* (2013.01); *B01D 46/003* (2013.01); *F01M 13/021* (2013.01); *F01M 2013/027* (2013.01); *F01M 2013/0438* (2013.01)

(58) Field of Classification Search
CPC ............ F01M 13/04; F01M 13/021; F01M 2013/027; F01M 2013/0438; F01M 13/028; B01D 46/003
See application file for complete search history.

(56) References Cited

U.S. PATENT DOCUMENTS

| 7,343,885 | B1 * | 3/2008 | Marley ............. F01M 13/04 123/41.86 |
| 2004/0093859 | A1 | 5/2004 | Schmeichel et al. |
| 2008/0104949 | A1 | 5/2008 | Schmeichel et al. |
| 2016/0138526 | A1 | 5/2016 | Peters et al. |

OTHER PUBLICATIONS

Eurasian Patent Office, Search Report Issued in Application No. 202191974, dated Feb. 25, 2022, 5 pages (Submitted with Partial Translation).

* cited by examiner

*Primary Examiner* — Jacob M Amick
(74) *Attorney, Agent, or Firm* — McCoy Russell LLP

(57) ABSTRACT

Systems and methods for engine coalescer exhaust extraction are provided. In one embodiment, a system comprises an engine including a crankcase fluidly coupled to a coalescer, a muffler adapted to receive combustion exhaust gases from the engine, and a coalescer exhaust passage fluidly coupling the coalescer to the muffler. The coalescer exhaust passage includes an inlet arranged upstream of the muffler adapted to flow a motive fluid to the coalescer exhaust passage to increase a flow speed of coalescer exhaust through the coalescer exhaust passage.

18 Claims, 10 Drawing Sheets

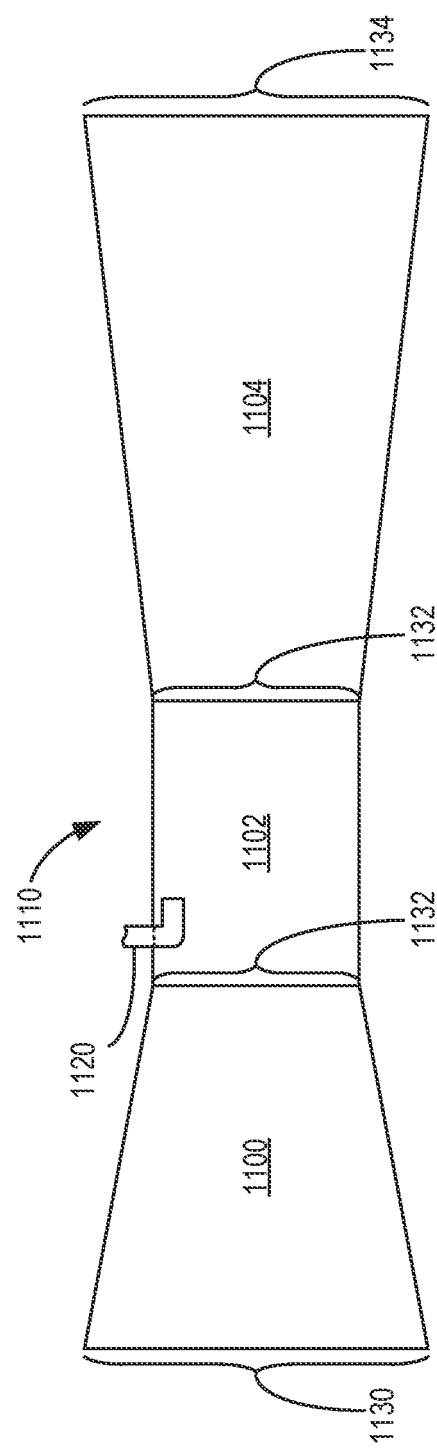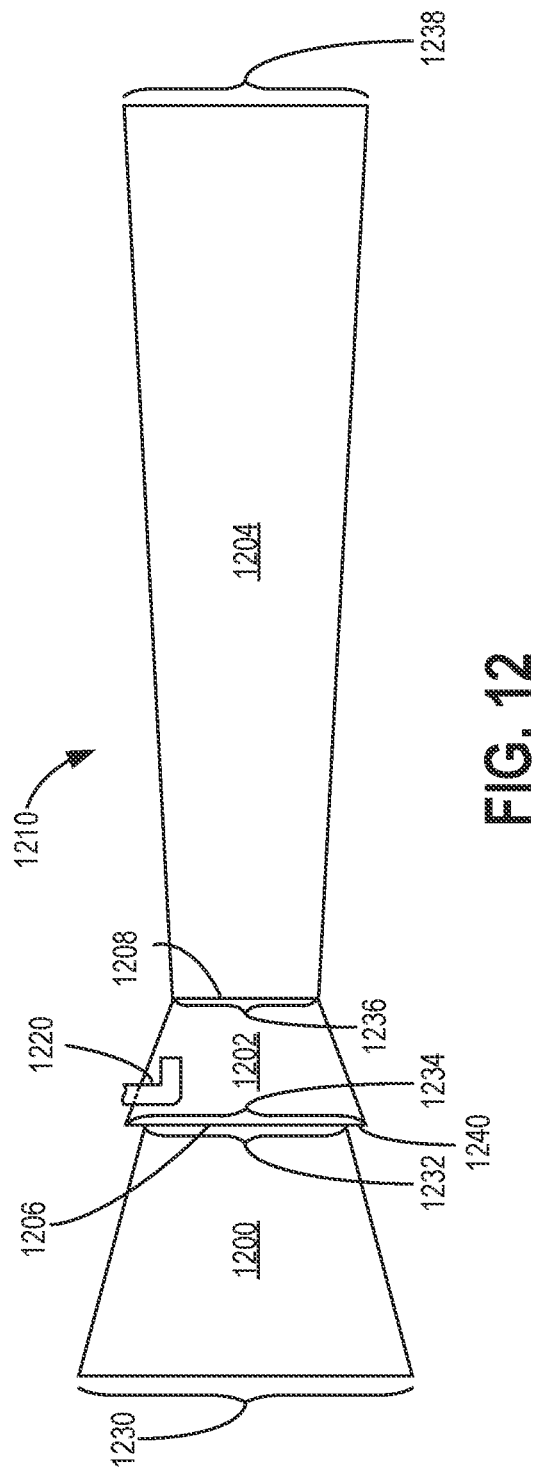

SYSTEMS AND METHODS FOR ENGINE COALESCER EXHAUST EXTRACTION

CROSS-REFERENCE TO RELATED APPLICATIONS

The present application claims priority to U.S. Provisional Application No. 63/069,980, entitled "SYSTEMS AND METHODS FOR ENGINE COALESCER EXHAUST EXTRACTION", and filed on Aug. 25, 2020. The entire contents of the above-listed application are hereby incorporated by reference for all purposes.

BACKGROUND

Embodiments of the subject matter disclosed herein relate to coalescer exhaust extraction for an engine.

BRIEF DESCRIPTION

An engine system may be configured to receive pressurized intake air from a turbocharger or supercharger for combustion with fuel within engine cylinders. During operation of the engine, a portion of gases may flow from the cylinders to a crankcase of the engine, with such gases often referred to as blowby gases. Blowby gases may include a mixture of intake gases, combustion gases, and/or aerosol oil. In order to reduce undesirable accumulation of blowby gases within the crankcase, the engine may include a coalescer configured to receive the blowby cases from the crankcase and separate the components of the blowby gases from each other. Some of the separated components may be returned to the engine while others may be routed to an exhaust stack of the engine. Routing gases separated by the coalescer to the exhaust stack may include flowing the gases to an eductor assembly directly coupled to a muffler of the engine system. However, such eductor assemblies often include components arranged within a flow path of combustion exhaust gases of the engine, which may increase a likelihood of soot accumulation at the eductor assembly and/or a service frequency of the eductor assembly. It may be desirable to have a system and method that differs from those that are currently available.

BRIEF DESCRIPTION OF THE FIGURES

FIGS. 11-16 show different coalescer exhaust passages having multiple sections.

FIGS. 2-10 are shown to scale, although other relative dimensions may be used, if desired.

DETAILED DESCRIPTION

Figure 9:
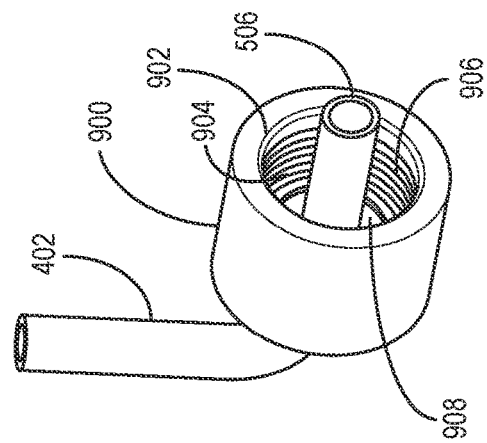
FIG. 9 shows an assembly of a boost air passage extension seated within a coalescer exhaust passage coupler.
Figure 10:
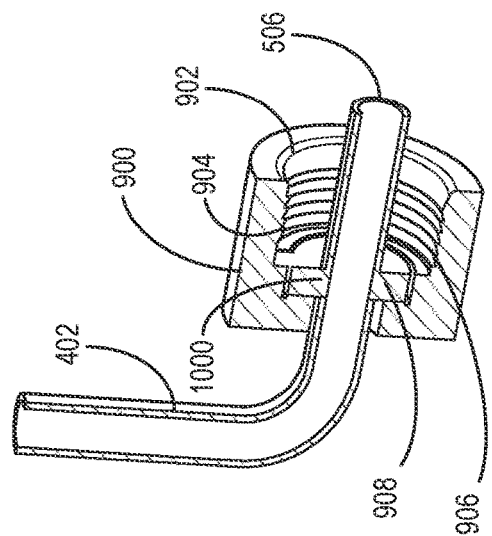
FIG. 10 shows a cross-sectional view of the assembly of FIG. 9.
Figure 8:
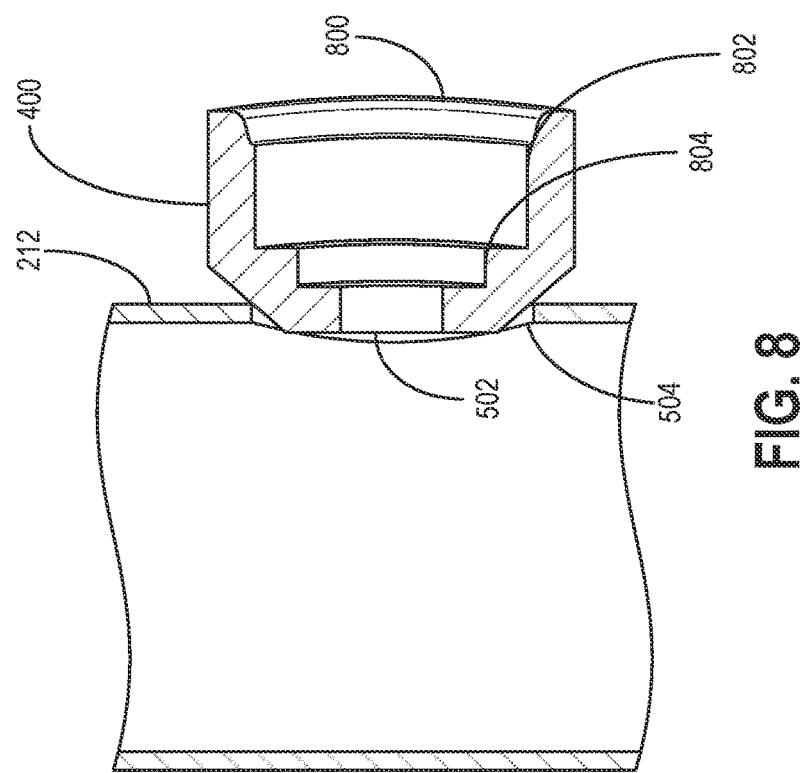
FIG. 8 shows an enlarged cross-sectional view of the coalescer exhaust passage and a coupler configured to couple the coalescer exhaust passage to the boost air passage.

The following description relates to embodiments of a system for coalescer exhaust extraction. An engine system, such as the engine system shown by FIG. 1, includes a coalescer and a muffler. The coalescer is fluidly coupled to the muffler by a coalescer exhaust passage, such as the coalescer exhaust passage shown by FIGS. 2-3. The coalescer exhaust passage includes a first section, a second section, and a third section, with the second section having a reduced diameter relative to the first and third sections, as shown by FIGS. 6-7. The second section is configured to receive a motive fluid, such as boost air, directly from a boost air passage, as shown by FIGS. 4-5. The second section may include an inlet, as shown by FIG. 8, with the boost air passage seated within the inlet, as shown by FIGS. 9-10. In some examples, the sections of the coalescer exhaust passage may have different lengths and/or amounts of taper, as shown by FIGS. 11-12, and in some examples the coalescer exhaust passage may include exactly two sections, as shown by FIGS. 13-16. The boost air increases a flow speed of coalescer exhaust through the second section, which reduces the pressure of the coalescer exhaust within the second section and increases a flow rate of blowby gases to the coalescer. As a result, an amount of blowby gases extracted by the coalescer may be increased. Increased extraction may reduce a likelihood of undesirable accumulator of blowby gases within the engine.

Figure 1:
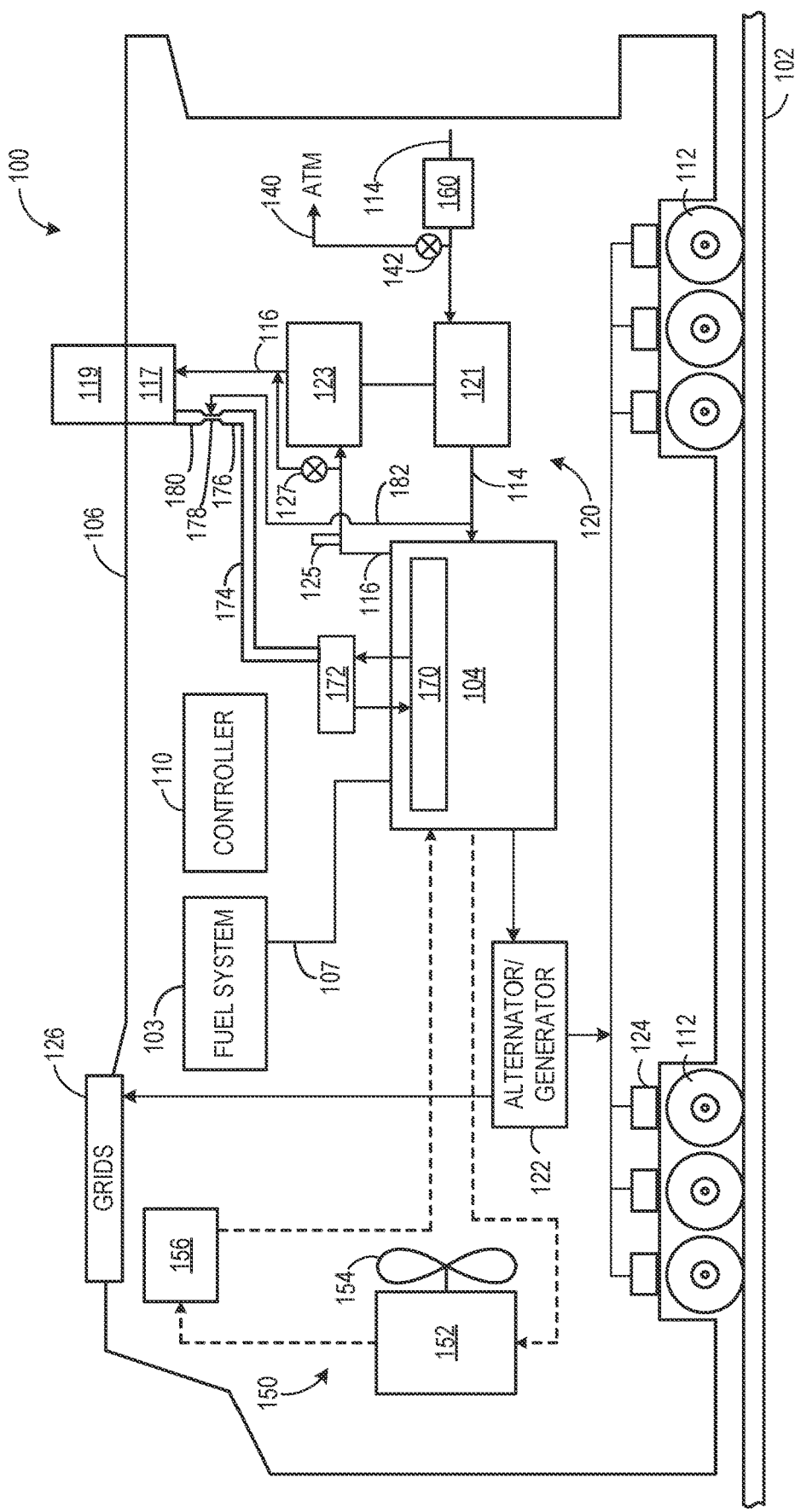
FIG. 1 shows a schematic diagram of a vehicle including an engine and a coalescer exhaust passage, according to an embodiment of the invention.

Referring to FIG. 1, a block diagram of an embodiment of a vehicle system 100 (is shown on a route 102, and is herein depicted as having an engine 104 disposed in a vehicle 106 with a plurality of wheels 112. In the illustrated embodiment the vehicle is a locomotive. The illustrated engine system is then a locomotive engine system. As depicted, the vehicle has the engine, and the engine includes a plurality of combustion chambers (e.g., cylinders) that are not labeled. The cylinders of the engine may receive fuel from a fuel system 103 via a fuel conduit 107. In some examples, the fuel conduit may be coupled with a common rail fuel line, a fuel pump, an accumulator, and a plurality of fuel injectors.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 116. Exhaust gas flows through the exhaust passage to a muffler 117 and out of an exhaust stack 119.

In one example, the engine is a multi-fuel engine that combusts air and two or more fuels. The fuels may be liquid, gaseous, or a combination thereof. Suitable liquid fuels may include gasoline, kerosene, diesel fuel, biodiesel, or other petroleum distillates. Other liquid fuels may include those of a density that may engage compression ignition. Suitable gaseous fuels may include natural gas, propane, syn gas, hydrogen, ammonia, and the like, and mixture of two or more of the foregoing. While compression ignition is contemplated in some examples, other ignition, such as spark ignition, and/or other forms of ignition such as laser, plasma, or the like may be used in some embodiments. As explained further below, the engine may operate in a multi-fuel mode where two or more fuels are simultaneously combusted in engine cylinders or in a single-fuel mode where only a single fuel is combusted in the engine cylinders. In one embodiment, the single-fuel mode may be a diesel fuel mode where 100% diesel fuel is combusted at the engine cylinders. In another example, the engine may be a dual fuel engine that combusts a mixture of gaseous fuel and diesel fuel. As used herein, a substitution ratio may refer to a ratio or percentage of a secondary fuel (such as gaseous fuel) to diesel fuel combusted at the engine cylinders. Again, a suitable engine may be a multi-fuel engine operating with diesel fuel and natural gas, but in other examples the engine may use other straight/mono fuels such as gasoline, diesel, or natural gas, hydrogen, ammonia, alcohol or may use various combinations of fuels other than diesel and natural gas.

In one example, the vehicle is a diesel-electric vehicle. As depicted in FIG. 1, the engine is coupled to an electric power generation system, which includes an alternator/generator 122 and electric traction motors 124. In another example, the alternator/generator may include a direct current (DC) generator. A suitable engine may be a diesel engine and/or natural gas engine. The engine may generate a torque output that is transmitted to the electric generator that is, in turn, mechanically coupled to the engine.

The generator may produce electrical power. That electrical power may be stored and/or applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one wheel of the plurality of wheels to provide tractive power to propel the vehicle. One example includes one traction motor per wheel set, while other example may have one traction motor per wheel. As depicted herein, six pairs of traction motors correspond to each of six pairs of motive wheels of the vehicle. In another example, alternator/generator, the traction motor(s), or both may be coupled to one or more resistive grids 126. The resistive grids may dissipate excess engine torque via heat produced by the grids from electricity generated by the alternator/generator. In embodiments where the vehicle is, for example, a marine vessel rather than a locomotive, the traction motor device supplies torque to a propeller shaft.

A crankcase 170 of the engine is fluidly coupled to a coalescer 172. The coalescer is configured to separate a blowby gas mixture flowing from the crankcase into different components. In particular, the coalescer may separate exhaust components, such as soot and/or oil, from the blowby gas mixture, with some of the exhaust components (e.g., liquid components) flowing from the coalescer to a sump of the engine, and with gaseous exhaust components of the blowby gas mixture flowing from the coalescer to the muffler via a coalescer exhaust passage 174 directly joined to (e.g., defined by) the coalescer. The coalescer exhaust passage is configured to receive boost air (e.g., via an inlet, similar to the example described further below) to increase an amount of venting of blowby gases from the crankcase via the coalescer, as described further below.

The vehicle system may include a turbocharger 120 that is arranged between the intake passage and the exhaust passage. In alternate embodiments, the turbocharger may be replaced with a supercharger. The turbocharger increases air charge of ambient air drawn into the intake passage in order to provide greater charge density during combustion to increase power output and/or engine-operating efficiency. As shown in FIG. 1, the turbocharger includes a compressor 121 (disposed in the intake passage) which is at least partially driven by a turbine 123 (disposed in the exhaust passage). While in this case a single turbocharger is included, the system may include multiple turbine and/or compressor stages. A temperature sensor 125 is positioned in the exhaust passage, upstream of an inlet of the turbine. In this way, the temperature sensor may measure a temperature of exhaust gases entering the turbine. As shown in FIG. 1, a wastegate 127 is disposed in a bypass passage around the turbine and may be adjusted, via actuation from controller 110, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system also includes a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage is additionally coupled to atmosphere, or exterior to the engine. In an alternate embodiment, the compressor bypass passage may be coupled to the intake passage, upstream of the compressor, and the exhaust passage, downstream of the turbine. In yet another embodiment, the compressor bypass passage may instead be an engine bypass passage coupled to the intake passage, downstream of the compressor (and have an engine bypass valve disposed therein) and thus divert airflow away from the engine after the airflow has passed through the compressor.

The compressor bypass passage is configured to divert airflow (e.g., from before the compressor inlet) away from the engine (or intake manifold of the engine) and to atmosphere. In the embodiment where the passage is instead an engine bypass passage, the engine bypass passage is configured to divert boosted airflow (e.g., from the compressor outlet) away from the engine and to atmosphere. A compressor bypass valve (CBV) 142 is positioned in the compressor bypass passage and includes an actuator actuatable by the controller to adjust the amount of intake airflow diverted away from the engine and to atmosphere. In one example, the compressor bypass valve may be a two-position, on/off valve. In another example, the compressor bypass valve may be a continuously variable valve adjustable into a fully open position, fully closed position, and a plurality of positions between fully open and fully closed. When the compressor bypass valve is in the fully closed (or closed) position, airflow may be blocked from flowing to atmosphere via the compressor bypass passage. As a result, all of the intake airflow may travel to the compressor and then to the engine for combustion in the engine cylinders.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems.

The vehicle system shown in FIG. 1 does not include an exhaust gas recirculation (EGR) system. However, in alternate embodiments, the vehicle system may include an EGR system coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system).

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by the controller. Coolant which is cooled by the radiator enters a tank 156. The coolant may then be pumped by a water, or coolant, pump (not shown) back to the engine or to another component of the vehicle system.

The vehicle further includes the engine controller (referred to herein as the controller) to control various components related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation.

The controller may receive information from a plurality of sensors and may send control signals to a plurality of actuators. The controller, while overseeing control and management of the vehicle, may be configured to receive signals from a variety of engine sensors, as further elaborated herein, in order to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), a wastegate, or the like. Other actively operating and controlling actuators may be coupled to various locations in the vehicle. In one example, adjusting an amount of intake airflow diverted away from the intake manifold and to atmosphere (and thus the amount of boosted intake airflow entering the engine) may include adjusting an actuator of the compressor bypass valve to adjust the amount of airflow bypassing the engine via the compressor bypass passage.

As described above, blowby gas mixture from the crankcase of the engine flows to the coalescer, where the blowby gas mixture is separated into different components. The gaseous component of the blowby gas mixture separated by the coalescer, referred to herein as coalescer exhaust, flows from the coalescer to the muffler via the coalescer exhaust passage. The coalescer exhaust passage includes a first section 176, a second section 178, and a third section 180. The second section is configured to have a smaller diameter than each of a diameter of the first section and a diameter of the third section, such that the coalescer exhaust flows through the second section at a higher flow speed relative to a flow speed of the coalescer exhaust through the first section and a flow speed of the coalescer exhaust through the third section. The diameters described herein are inner diameters (e.g., interior diameters). Further, the second section is fluidly coupled to the compressor of the turbocharger via boost air passage 182 such that a motive fluid, such as boost air (e.g., air compressed by the compressor), may flow from the compressor to the second section. During conditions in which boost air flows to the second section, the flow speed of coalescer exhaust through the second section is increased by the flow of boost air to the second section. For example, the coalescer exhaust may mix and/or converge with the boost air within the second section. The boost air in this configuration acts as a motive fluid to increase the flow speed of the coalescer exhaust. The increased flow speed of the coalescer exhaust results in a reduced pressure of the coalescer exhaust within the second section, and a pressure differential between the first section and the second section is increased. The increased pressure differential results in an increased flow rate of blowby gas mixture from the crankcase of the engine to the coalescer, and the increased flow rate of the blowby gas mixture increases the flow rate of coalescer exhaust from the coalescer. As a result, an amount of blowby gas mixture removed from the crankcase by the coalescer may be increased, and coalescer efficiency is increased. The diameter of the first section, the diameter of the second section, and the diameter of the third section may be configured to maintain a desired crankcase pressure (e.g., maintain a desired extraction rate of blowby gases from the crankcase).

Further, by coupling the boost air passage to the second section, degradation of the coalescer exhaust passage and/or boost air passage may be reduced relative to examples in which the boost air passage is not coupled to the second section. For example, coupling the boost air passage to the third section of the coalescer exhaust passage decreases a distance between the boost air passage and the muffler, which may increase a likelihood of degradation of the boost air passage resulting from proximity to engine combustion exhaust gases flowing to the muffler. Further, by configuring the boost air passage to provide motive fluid to the second section of the coalescer exhaust passage in the form of boost air, degradation of the coalescer exhaust passage may be reduced relative to examples in which a different motive fluid is provided. In particular, the configurations described herein reduce exposure of the coalescer exhaust passage to engine combustion exhaust gases, which may reduce degradation of the coalescer exhaust passage and/or reduce a maintenance frequency of the engine system.

Figure 2:
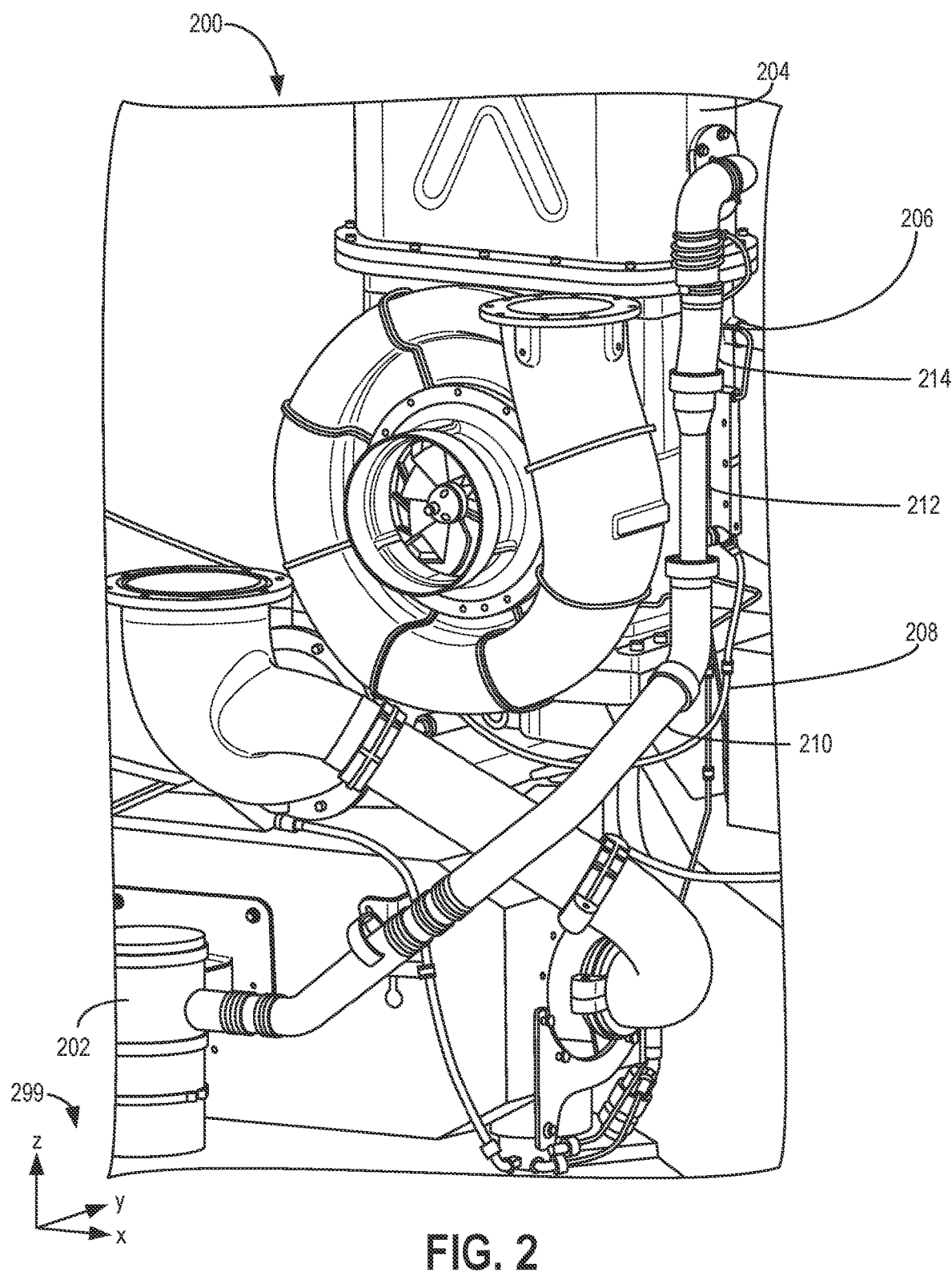
FIG. 2 shows an engine system including a coalescer exhaust passage coupled to a coalescer and a muffler.
Figure 3:
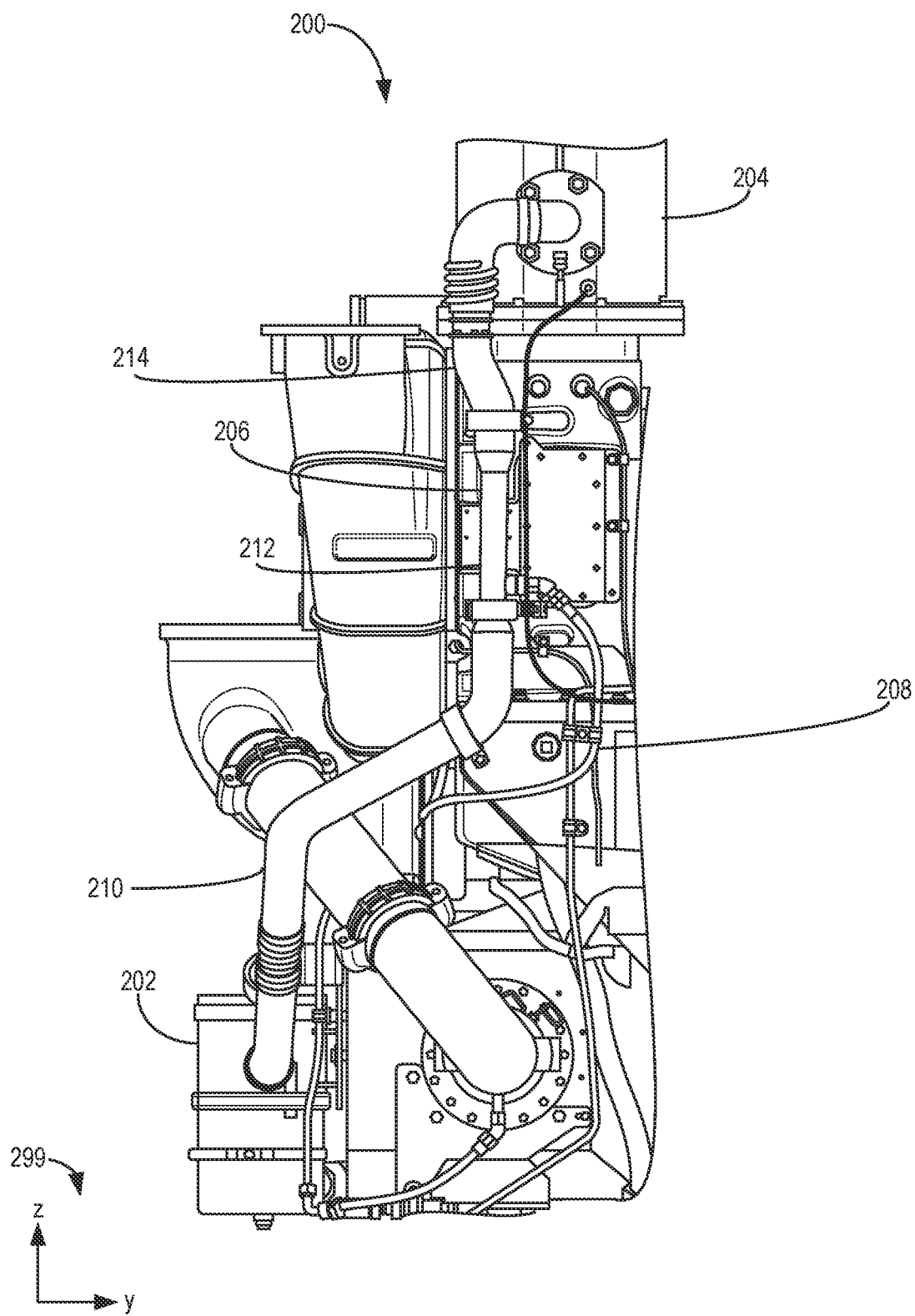
FIG. 3 shows another view of the engine system and coalescer exhaust passage.
Figure 4:
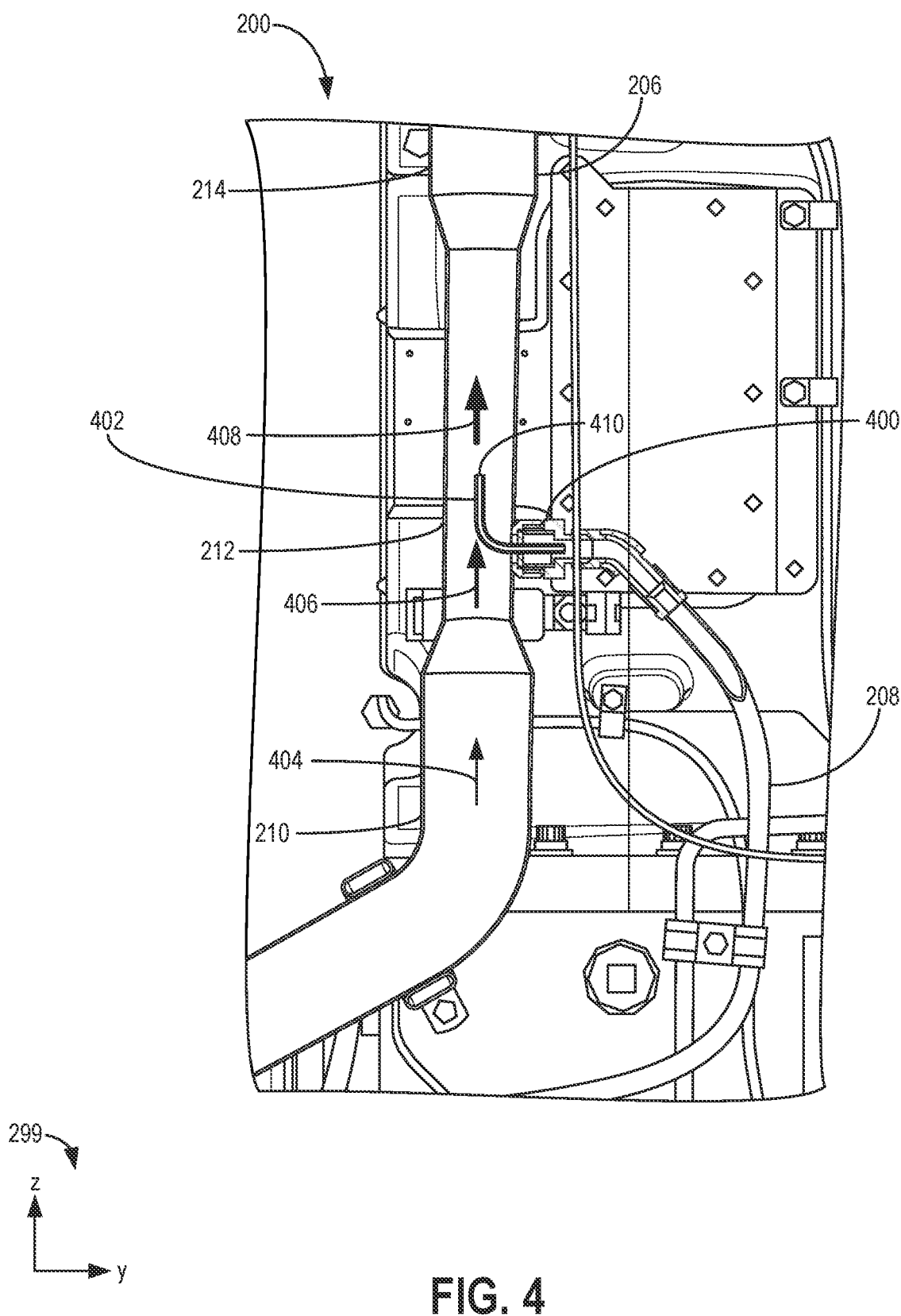
FIG. 4 shows a cross-sectional side view of the coalescer exhaust passage and a boost air passage.
Figure 5:
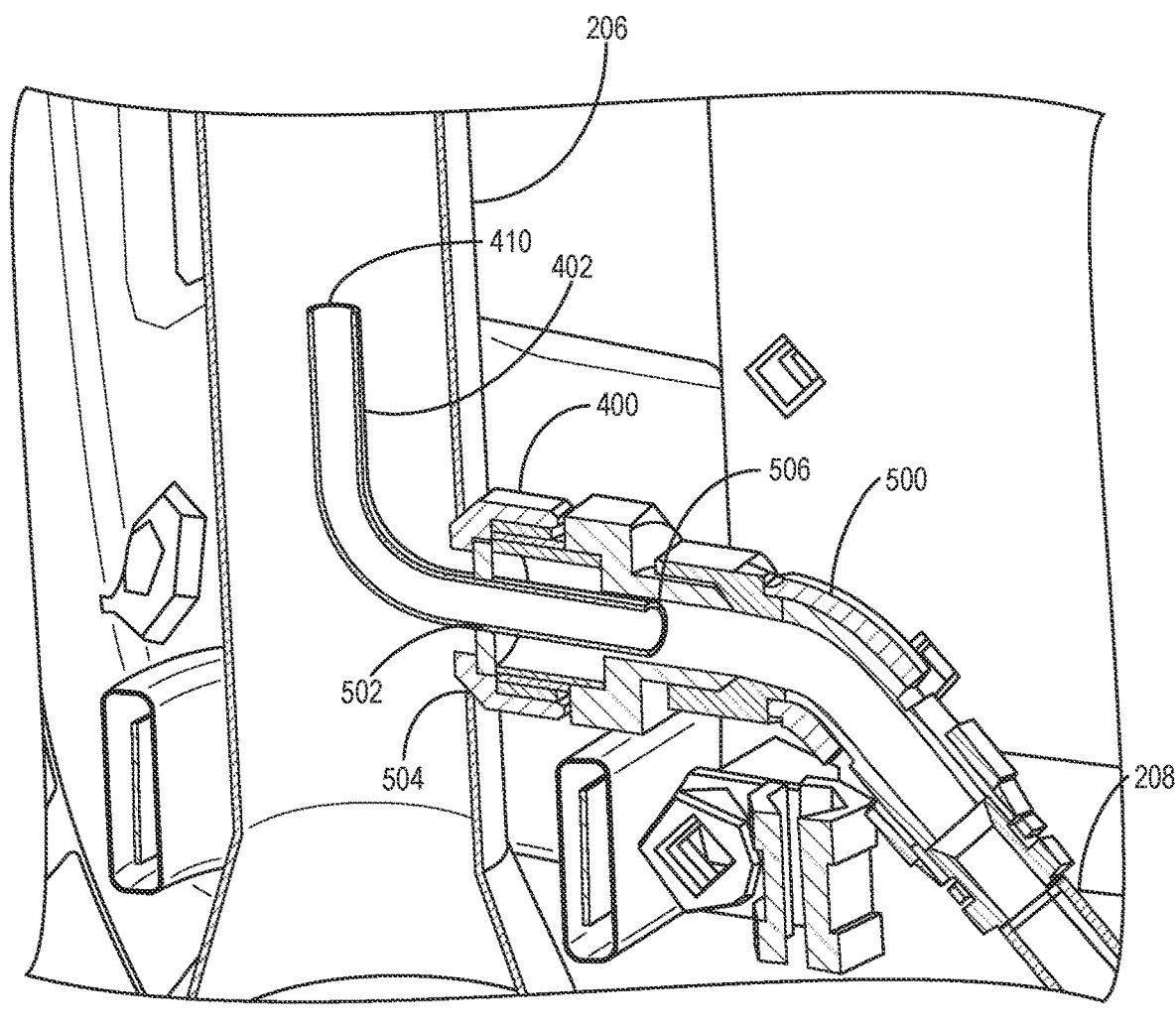
FIG. 5 shows an enlarged cross-sectional side view of the coalescer exhaust passage and the boost air passage.
Figures 6, 7:
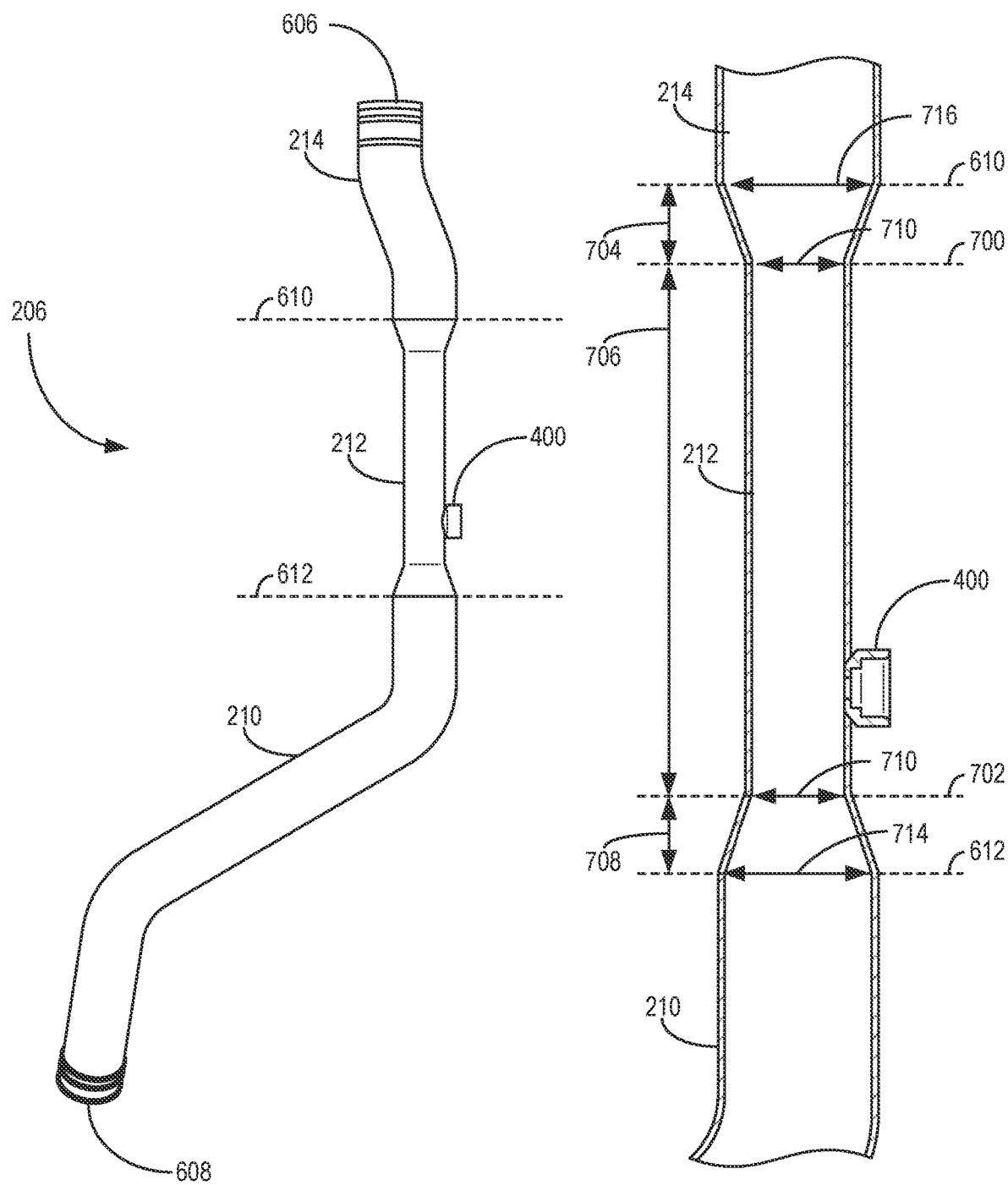
FIG. 6 shows the coalescer exhaust passage separated from the coalescer and muffler.
FIG. 7 shows a cross-sectional view of the coalescer exhaust passage separated from the coalescer and muffler.

FIGS. 2-5 each show different views of an engine system 200. As shown by FIGS. 2-3, the engine system including a coalescer 202 and a muffler 204 fluidly coupled by a coalescer exhaust passage 206 configured to receive boost air via a boost air passage 208. The engine system, coalescer, muffler, coalescer exhaust passage, and boost air passage may be similar to, or the same as, the engine system, coalescer, muffler, coalescer exhaust passage, and boost air passage, respectively, described above with reference to FIG. 1. Reference axes 299 are included by FIGS. 2-5 for comparison of the views shown.

The coalescer exhaust passage includes a first section 210 having a first end 608, a second section 212, and a third section 214 having a second end 606. The first section, second section, and third section may be similar to, or the same as, the first section, second section, and third section, respectively, of the coalescer exhaust passage described above with reference to FIG. 1. As described in further detail below, the second section is configured with a smaller diameter than each of a diameter of the first section and a diameter of the third section. In this configuration, as coalescer exhaust flows from the coalescer through the coalescer exhaust passage, a flow speed of the coalescer exhaust is increased through the second section relative to the flow speed through each of the first section and third section. The increased flow speed of the coalescer exhaust within the second section results in a decreased pressure of the coalescer exhaust within the second section. Additionally, the second section may receive boost air via the boost air passage, with a pressure of the boost air being higher than a pressure of the coalescer exhaust within the second section. The flow of boost air to the second section may further increase the flow speed of the coalescer exhaust through the second section, and as a result, the pressure of the coalescer exhaust within the second section may further decrease.

The increased flow speed of the coalescer exhaust through the second section may result in a pressure differential between the first section and second section, which may increase a removal of blowby gases from a crankcase of the engine system fluidly coupled to the coalescer (e.g., similar to the example described above with reference to FIG. 1). In particular, because the pressure of the coalescer exhaust within the second section may be lower than the pressure of the coalescer exhaust within the first section (e.g., due to the increased flow rate of the coalescer exhaust through the second section), coalescer exhaust within the first section may more readily flow into the second section, and a backpressure against the blowby gases within the crankcase may be reduced such that a flow rate of blowby gases into the coalescer is increased.

An example flow of gases through the coalescer exhaust passage and boost air passage is shown by FIG. 4. Specifically, FIG. 4 shows a cross-sectional view of the boost air passage coupled to the coalescer exhaust passage. Coalescer exhaust flows through the first section of the coalescer exhaust pipe at a lower, first speed, as indicated by arrow 404 having a thinner, first thickness. The coalescer exhaust flows from the first section to the second section, and as the coalescer exhaust flows through the second section, the flow speed of the coalescer exhaust is increased due to the reduced diameter of the second section relative to the diameter of the first section, as indicated by arrow 406 having a medium, second thickness. During conditions in which boost air flows into the second section via the boost air passage, the flow speed of the coalescer exhaust through the second section is further increased by the flow of the boost air, as indicated by arrow 408 having a thicker, third thickness (e.g., where the relative thickness of the arrows indicates the relative flow speed). At least at locations downstream of an outlet 410 of an extension 402 of the boost air passage within the second section, the flow speed of the coalescer exhaust is increased by the boost air.

The boost air passage includes a coupler 400 configured to couple the boost air passage to the coalescer exhaust passage. In some embodiments, the coupler may be a threadolet. The extension of the boost air passage may extend through the coupler and into the coalescer exhaust passage. The coupler may maintain the boost air passage in engagement with the coalescer exhaust passage, and the extension may be partially disposed within each of the boost air passage and the coalescer exhaust passage. Boost air flowing through the boost air passage may flow through the extension and into the coalescer exhaust passage, resulting in an increased flow speed of coalescer exhaust within the second section of the coalescer exhaust passage as described above.

Referring to FIG. 5, an enlarged cross-sectional view of the boost air passage coupled to the coalescer exhaust passage is shown. As shown, the coalescer exhaust passage includes an opening 504 (e.g., an aperture) configured to receive the coupler of the boost air passage. In some examples, the coupler may include threads configured to engage with counterpart threads of the coalescer exhaust passage at the opening. In the embodiment shown, the coupler includes an inlet 502 configured to receive the extension of the boost passage. The extension may seat within the inlet and may extend into the coalescer exhaust passage from the inlet. Boost air from the boost passage may flow into the extension via an orifice 506 of the extension arranged within the coupler, and the boost air may flow out of the outlet of the extension into the coalescer exhaust passage. The boost passage may be coupled to the coupler via a fitting 500 in some embodiments, and the fitting may include threads configured to engage with counterpart threads of the coupler in order to maintain the fitting and coupler in engagement with each other. In some embodiments, boost air may flow directly from the boost air passage to the inlet of the coalescer exhaust passage without the extension.

Referring to FIGS. 6-7, the coalescer exhaust passage is shown separated from the engine system for clarification purposes. First axis 612 is arranged at the transition between the first section and the second section (e.g., a first end of the second section), and second axis 610 is arranged at the transition between the second section and the third section (e.g., a second end of the second section). The first axis is arranged parallel with the second axis, with the second section extending from the first section to the third section between the first axis and second axis. In some embodiments, the first section, second section, and third section may be a single, unitary piece (e.g., formed or molded together as a single unit). In other embodiments, the first section, second section, and third section may be coupled together by fasteners (e.g., bolts) or other components (e.g., fittings).

As shown by FIG. 7, the first section has first inner diameter 714 at the location at which the first section transitions to the second section (e.g., at the first axis). In some embodiments, the first inner diameter may be 73 millimeters. The second section transitions (e.g., tapers) from the first inner diameter to second inner diameter 710, where the second inner diameter is less than (e.g., smaller than) the first inner diameter. In some embodiments, the second inner diameter may be 47 millimeters. The transition occurs through a first length 708 of the second section, where the first length 708 extends between the first axis and a third axis 702, with the third axis arranged parallel to the first axis. In some embodiments, the first length may be in a range of about 38 millimeters (e.g., approximately 38 millimeters). The second section further transitions from the second inner diameter to third inner diameter 716 of the third section. In some embodiments, the third inner diameter may be the same as (e.g., a same diameter as) the first inner diameter of the first section. For example, the third inner diameter may be 73 millimeters. In other embodiments, the third inner diameter may be different than the first inner diameter. However, in each embodiment, the first inner diameter and third inner diameter are each larger than the second inner diameter. The second section transitions from the second inner diameter to the third inner diameter through a second length 704, with the second length extending between a fourth axis 700 and the second axis, and with the fourth axis arranged parallel to the second axis. In some embodiments, the second length may be in a range of from about 38 millimeters (e.g., approximately 38 millimeters). Portions of the second section between the third axis and fourth axis may be relatively straight along a third length 706 (e.g., not tapered), with each portion of the second section between the third axis and fourth axis having the second inner diameter. In some embodiments, the third length may be in a range of about 262 millimeters (e.g., approximately 262 millimeters). In some embodiments, the coupler and the inlet of the coalescer exhaust passage may be arranged to be about 88 millimeters (e.g., approximately 88 millimeters) from the first section and to be about 250 millimeters (e.g., approximately 250 millimeters) from the third section in the direction between the first axis and second axis. In particular, the diameter of the second section at each location between the third axis and fourth axis may be the smaller, second inner diameter. The various exemplary sizes, lengths and distances may be selected with reference to end use parameters.

Referring to FIG. 8, an enlarged cross-sectional view of the coupler coupled to the second section of the coalescer exhaust passage is shown. The coupler includes a main opening 800 and may include one or more openings of different size (e.g., different diameter), such as first inner opening 802 and second inner opening 804. The different sizes of the inner openings may provide inner surfaces configured to engage with a portion of the extension of the boost air passage. Further, in some embodiments, at least a portion of the inner surfaces may include threading configured to engage with counterpart threading of a component of the extension of the boost air passage, similar to the example described below with reference to FIGS. 9-10.

FIG. 9 shows a coupler 900 configured to receive the extension of the boost air passage, similar to the coupler described above. The coupler shown by FIG. 9 includes a main opening 902 and a first inner opening 904, with inner surfaces of the coupler forming the first inner opening including threading 906 configured to engage with counterpart threading of an annulus 908 of the extension of the boost air passage, as shown by the cross-sectional view of FIG. 10. In some embodiments, the first inner opening may have a depth in a range of about 14 millimeters (e.g., approximately 14 millimeters). Coupling the annulus to the coupler by engaging the threads of the annulus with the counterpart threads of the coupler may maintain the extension of the boost air passage within the coupler due to the arrangement of the extension through an orifice 1000 of the annulus.

Figure 13:
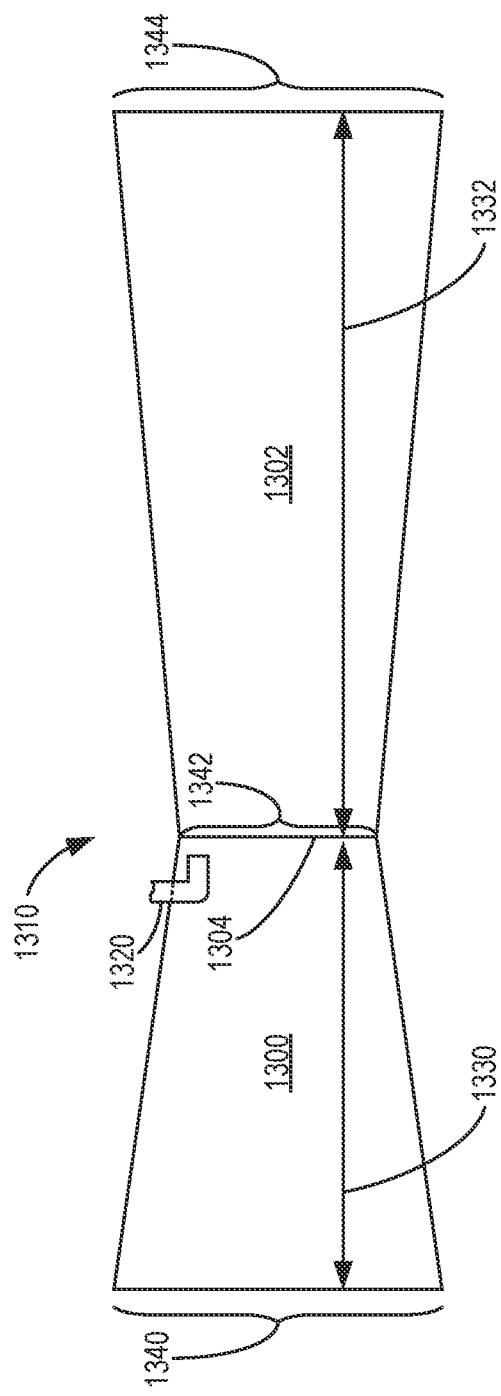
Figure 14:
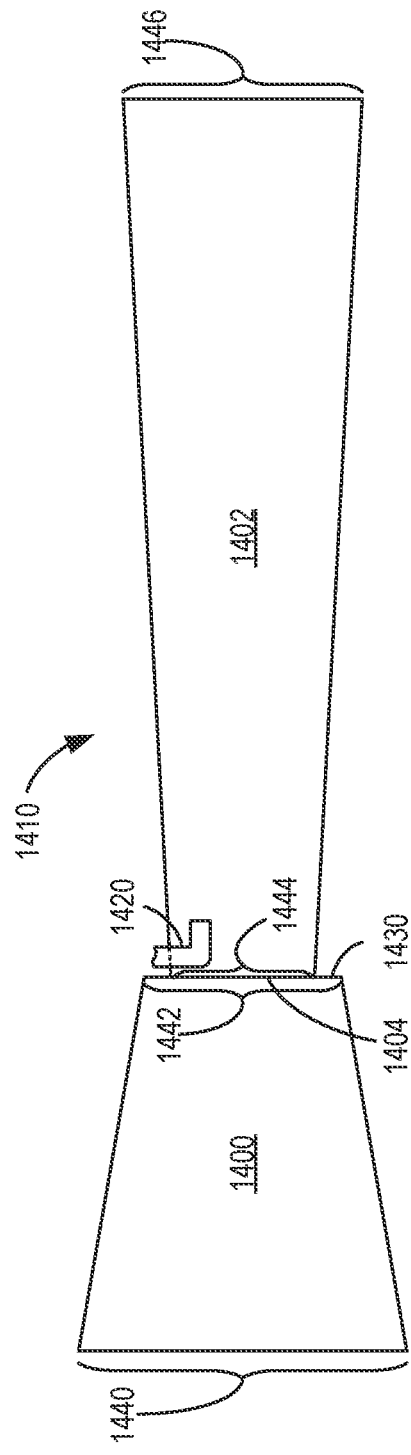
Figure 15:
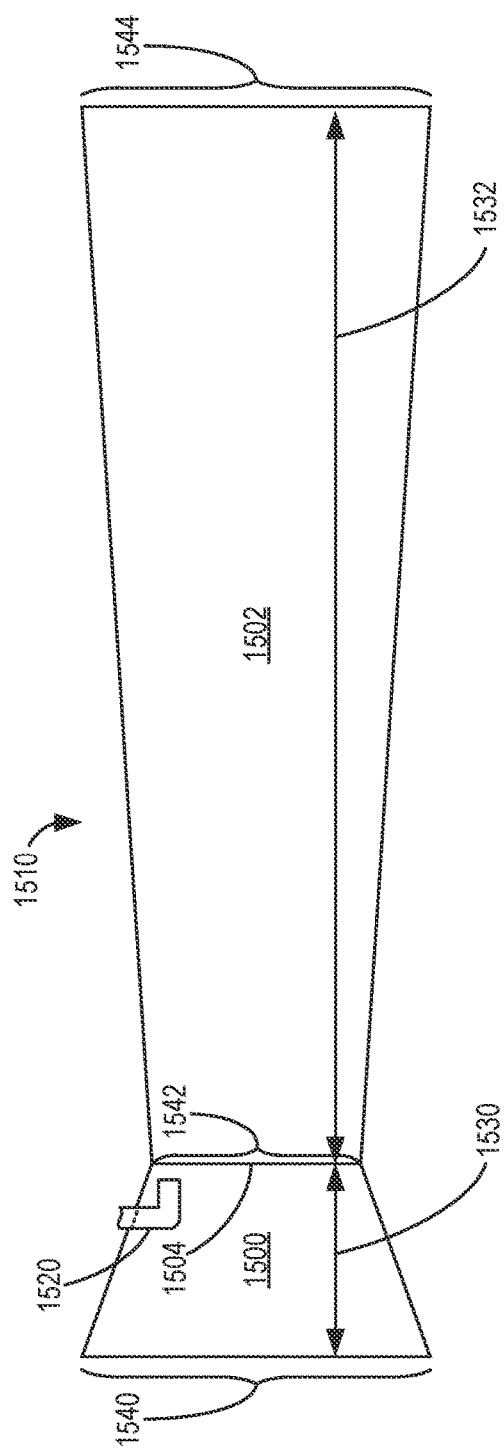
Figure 16:
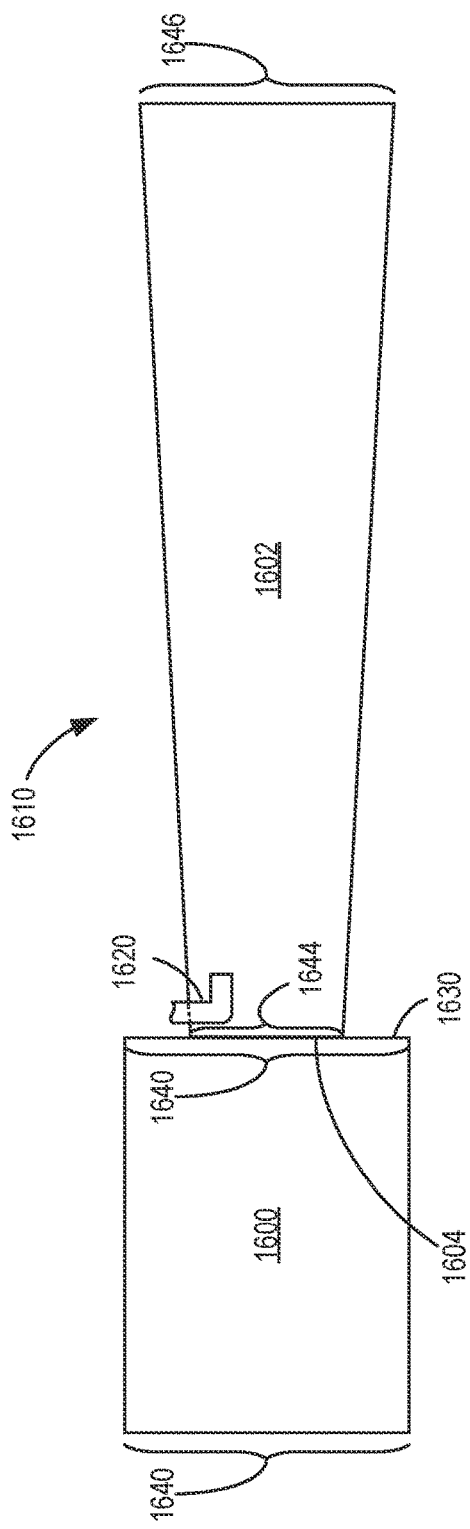

FIGS. 11-16 show different examples of coalescer exhaust passages. In particular, FIG. 11 shows coalescer exhaust passage 1110, FIG. 12 shows coalescer exhaust passage 1210, FIG. 13 shows coalescer exhaust passage 1310, FIG. 14 shows coalescer exhaust passage 1410, FIG. 15 shows coalescer exhaust passage 1510, and FIG. 16 shows coalescer exhaust passage 1610. The coalescer exhaust passages described herein with reference to FIGS. 11-16 may be included by the engine system described above with reference to FIGS. 2-5. For example, the coalescer exhaust passages of FIGS. 11-16 may be alternate examples of the coalescer exhaust passage described above with reference to FIGS. 2-5.

The coalescer exhaust passages shown by FIGS. 11-16 each include a narrowed portion configured to increase the flow speed of the coalescer exhaust, similar to the examples described above. The coalescer exhaust passage shown by FIG. 11 includes a first section 1100, a second section 1102, and a third section 1104, with the first section tapering and reducing from a first diameter 1130 to a second diameter 1132 in a direction toward the second section, and with the third section tapering and enlarging from the second diameter to a third diameter 1134 in a direction away from the second section. In this configuration, the first section tapers by a first amount to the joint joining the first section with the second section, and the third section tapers by a second amount from the joint joining the second section with the third section (e.g., a slant of walls of the first section is different than a slant of walls of the third section). An example position of a boost air passage 1120 (e.g., similar to the boost air passage described above) extending into the coalescer exhaust passage is shown. The boost air passage may provide motive fluid (e.g., boost air) to the coalescer exhaust passage in order to further increase the flow speed of coalescer exhaust through the coalescer exhaust passage.

The coalescer exhaust passage shown by FIG. 12 includes a first section 1200, a second section 1202, and a third section 1204, with the first section tapering and reducing from a first diameter 1230 to a second diameter 1232 toward the second section, with the portion of the second section joined to the first section having a third diameter 1234 that is increased relative to the second diameter. In this configuration, the second section includes a protruding portion 1240 (which may be referred to herein as a step) that extends radially outward from a first joint 1206 joining the first section with the second section. The second section tapers from the third diameter to a fourth diameter 1236 in a direction toward the third section and is joined to the third section at a second joint 1208. In this configuration, the first section tapers by a first amount to the joint (e.g., a slant of walls of the first section is different than a slant of walls of the second section), and the second section tapers by a second amount from the joint. The third section tapers from the fourth diameter to a fifth diameter 1238 in a direction away from the second section, with the fifth diameter being larger than the fourth diameter. An example position of a boost air passage 1220 (e.g., similar to the boost air passage described above) extending into the coalescer exhaust passage is shown. In some examples, the protruding portion may increase an expansion of coalescer exhaust within the second section which may increase desirable flow characteristics of the coalescer exhaust (e.g., increase a flow speed of the coalescer exhaust and/or increase a flow of motive fluid, such as boost air, to the second section).

FIGS. 13-16 each show coalescer exhaust passages that include exactly two sections. In particular, the coalescer exhaust passage shown by FIG. 13 includes a first section 1300 that tapers from a larger first diameter 1340 to a smaller second diameter 1342, with the smaller diameter portion arranged at a joint 1304 between the first section and a second section 1302. The second section tapers from the smaller second diameter to a larger third diameter 1344, and the second section has a length 1332 that is approximately 160% a length 1330 of the first section. In some examples, the first diameter and third diameter may be equal (e.g., a same amount of diameter). In this configuration, the first section tapers by a first amount to the joint and the second section tapers by a second amount away from the joint (e.g., a slant of walls of the first section is different than a slant of walls of the second section). An example position of a boost air passage 1320 extending into the coalescer exhaust passage is shown. The coalescer exhaust passage shown by FIG. 15 has a similar configuration, with a first section 1500 joined to a second section 1502 by joint 1504, and with boost air passage 1520 shown in an example position. The first section tapers toward the second section from a larger first diameter 1540 to a smaller second diameter 1542, with the second diameter being a diameter of the joint joining the first section with the second section. The second section tapers away from the first section and increases in size from the second diameter to a third diameter 1544, where the third diameter is larger than the second diameter. In some examples, the first diameter and third diameter may be equal. In this configuration, the first section tapers by a first amount to the joint and the second section tapers by a second amount away from the joint (e.g., a slant of walls of the first section is different than a slant of walls of the second section). In the example shown by FIG. 15, a length 1532 of the second section is approximately 550% a length 1530 of the first section. It should be noted that the examples shown by FIG. 13 and FIG. 15 are not intended to be limiting, and in other examples the first section and second section may have different relative lengths.

In the example shown by FIG. 14, the coalescer exhaust passage includes a first section 1400 joined to a second section 1402 at joint 1404, and a boost air passage 1420 is shown in an example position. The first section tapers and reduces from a first diameter 1440 to a second diameter 1442 in a direction toward the second section (e.g., toward the joint), while the second section tapers and increases from a third diameter 1444 to a fourth diameter 1446 from the joint. The diameter of the first section at the joint is larger than the diameter of the second section at the joint, resulting in an edge 1430, or step, formed at the joint between the first section and second section. In this configuration, the first section tapers by a first amount to the joint and the second section tapers by a second amount away from the joint (e.g., a slant or angle of walls of the first section is different than a slant or angle of walls of the second section). Similarly, in the example shown by FIG. 16, the coalescer exhaust passage includes a first section 1600 joined to a second section 1602 at joint 1604, and a boost air passage 1620 is shown in an example position. However, the first section does not taper and instead extends with a relatively constant first diameter 1640 toward the joint (e.g., the first section does not reduce or increase in diameter toward the joint), and a second diameter 1644 of the second section at the joint is less than the relatively constant first diameter of the first section. As a result, an edge 1630 is formed at the joint, where the edge may have a larger size (e.g., diameter) relative to the edge described above with reference to FIG. 14. The second section tapers from the second diameter at the joint to a third diameter 1646 in a direction away from the first section, with the third diameter being larger than the second diameter. In some examples, the third diameter may be equal to the first diameter. Similar to the example described above with reference to FIG. 12, the steps shown by FIGS. 14 and 16 may increase desirable flow characteristics of the coalescer exhaust (e.g., increase a flow speed of the coalescer exhaust and/or increase a flow of motive fluid, such as boost air, to the second section) and/or reduce an amount of space occupied by the coalescer exhaust passage.

The tapering of the various sections described above with reference to FIGS. 11-16 may increase desirable flow characteristics as well and/or reduce the amount of space occupied by the coalescer exhaust passage. As a result, an amount of blowby gas mixture removed from the crankcase by the coalescer may be increased, and coalescer efficiency may be increased. The tapering of the various sections may result in a more consistent maintenance of a desired crankcase pressure by the coalescer exhaust passage (e.g., maintain a desired extraction rate of blowby gases from the crankcase). For example, sections having a longer length with a smaller amount of taper may have different flow characteristics relative to sections having a shorter length with a larger amount of taper, and the flow characteristics of the longer sections and shorter sections may complement each other to provide an overall flow through the coalescer exhaust passage that increases extraction of blowby gases and increases coalescer efficiency.

It should be understood that the examples described above with reference to FIGS. 11-16 are not intended to be limiting, and in other examples the various sections may have different lengths, amounts of tapering, boost air passage position, etc. However, in each example, the coalescer exhaust passage includes a narrowed portion, with the boost air passage arranged at the narrowed portion to increase the flow speed of coalescer exhaust through the coalescer exhaust passage (e.g., via the motive fluid provided by the boost air passage).

By configuring the engine system with the coalescer exhaust passage according to the embodiments described above, the coalescer exhaust passage may increase extraction of blowby gases from the crankcase of the engine to the coalescer by increasing the flow speed of coalescer exhaust through the coalescer exhaust passage. As a result, undesirable accumulation of blowby gases within the crankcase may be reduced. Further, by coupling the boost air passage to the coalescer exhaust passage at the second section upstream of the muffler, the flow speed of coalescer exhaust through the coalescer exhaust passage may be increased and degradation of the boost air passage and/or coalescer exhaust passage resulting from contact with engine combustion exhaust gases may be reduced.

As used herein, the term "approximately" is construed to mean plus or minus five percent of the range unless otherwise specified.

The disclosure also provides support for a system, comprising: an engine including a crankcase fluidly coupled to a coalescer, a muffler adapted to receive combustion exhaust gases from the engine, and a coalescer exhaust passage fluidly coupling the coalescer to the muffler and including an inlet arranged upstream of the muffler adapted to flow a motive fluid to the coalescer exhaust passage. In a first example of the system, the system further comprises: a compressor of a turbocharger or supercharger fluidly coupled to the inlet by a boost air passage. In a second example of the system, optionally including the first example, the system further comprises: an extension of the boost air passage extending into the coalescer exhaust passage through the inlet. In a third example of the system, optionally including one or both of the first and second examples, the motive fluid includes boost air generated by the compressor. In a fourth example of the system, optionally including one or more or each of the first through third examples, the system further comprises: a coupler configured to maintain the boost air passage in engagement with the inlet. In a fifth example of the system, optionally including one or more or each of the first through fourth examples, the coalescer exhaust passage includes a first section having a larger, first diameter and a second section having a smaller, second diameter, with the inlet formed at the second section. In a sixth example of the system, optionally including one or more or each of the first through fifth examples, the first section directly couples the coalescer exhaust passage to the crankcase. In a seventh example of the system, optionally including one or more or each of the first through sixth examples, the coalescer exhaust passage further includes a third section directly coupling the coalescer exhaust passage to the muffler and having a third diameter, with the second section arranged between the first section and the third section and with the third diameter being larger than the second diameter. In an eighth example of the system, optionally including one or more or each of the first through seventh examples, the second section includes a first end transitioning from the first diameter at the first section to the second diameter, and a second end transitioning from the second diameter to the third diameter at the third section. In a ninth example of the system, optionally including one or more or each of the first through eighth examples, the second section includes a straight portion extending between the first end and the second end, with the straight portion having the second diameter and with the inlet formed at the straight portion. In a tenth example of the system, optionally including one or more or each of the first through ninth examples, the coupler is a threadolet including inner surfaces shaped to engage with an annulus of the boost air passage. In an eleventh example of the system, optionally including one or more or each of the first through tenth examples, the first section directly couples the coalescer exhaust passage to the crankcase.

The disclosure also provides support for a method, comprising: flowing blowby gases from a crankcase of an engine to a coalescer, forming coalescer exhaust from the blowby gases, flowing the coalescer exhaust from the coalescer to a muffler via a coalescer exhaust passage, and increasing a flow speed of the coalescer exhaust through the coalescer exhaust passage via a motive fluid received at an inlet of the coalescer exhaust passage upstream of the muffler. In a first example of the method, the motive fluid includes boost air flowing from a compressor. In a second example of the method, optionally including the first example, the coalescer exhaust passage includes a first section, a second section, and a third section, with the second section arranged between the first section and the third section and having a diameter less than each of a diameter of the first section and a diameter of the third section, and wherein increasing the flow speed of the coalescer exhaust includes flowing the motive fluid directly to the second section. In a third example of the method, optionally including one or both of the first and second examples, flowing the coalescer exhaust from the coalescer to the muffler includes flowing the coalescer exhaust through the first section into the second section, then flowing the coalescer exhaust through the second section and into the third section, and then flowing the coalescer exhaust through the third section and into the muffler.

The disclosure also provides support for a system, comprising: a coalescer defining a coalescer exhaust passage that fluidly couples to a muffler, including: a first section configured to receive coalescer exhaust from the coalescer at a lower, first speed, and a second section configured to flow the coalescer exhaust from the first section to the muffler at a higher, second speed. In a first example of the system, the first section and the second section have a different diameter or length. In a second example of the system, optionally including the first example, the first section tapers by a first amount to a joint between the first section to the second section, and the second section tapers by a second amount from the joint. In a third example of the system, optionally including one or both of the first and second examples, the first section and the second section are coupled at a joint, and where a diameter of the coalescer exhaust passage at the joint is greater than a diameter of the first section or a diameter of the second section. In a fourth example of the system, optionally including one or more or each of the first through third examples, the system further comprises: a compressor fluidly coupled to the second section via a boost air passage, the compressor configured to flow boost air to the second section via the boost air passage. In a fifth example of the system, optionally including one or more or each of the first through fourth examples, the coalescer exhaust passage further includes a third section arranged downstream of the second section and directly coupled to the muffler, with the third section configured to flow a mixture of the coalescer exhaust and the boost air from the second section to the muffler.

FIGS. 2-16 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and proceeded with the word "a" or "an" should be understood as not excluding plural of said elements or steps, unless such exclusion is explicitly stated. References to "one embodiment" or "one example" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property. The terms "including" and "in which" are used as the plain-language equivalents of the respective terms "comprising" and "wherein." Moreover, the terms "first," "second," and "third," etc., are used merely as labels, and are not intended to impose numerical requirements or a particular positional order on their objects.

This written description uses examples to disclose the invention and to enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be combined by one of ordinary skill in the art to construct additional embodiments and techniques in accordance with principles of this application.

The invention claimed is:

1. A system, comprising:
   an engine including a crankcase fluidly coupled to a coalescer;
   a muffler adapted to receive combustion exhaust gases from the engine; and
   a coalescer exhaust passage fluidly coupling the coalescer to the muffler and including an inlet arranged upstream of the muffler adapted to flow a motive fluid to the coalescer exhaust passage, wherein the coalescer exhaust passage includes a first section having a larger, first diameter and a second section having a smaller, second diameter, with the inlet formed at the second section.

2. The system of claim 1, further comprising a compressor of a turbocharger or supercharger fluidly coupled to the inlet by a boost air passage.

3. The system of claim 2, further comprising an extension of the boost air passage extending into the coalescer exhaust passage through the inlet.

4. The system of claim 2, wherein the motive fluid includes boost air generated by the compressor.

5. The system of claim 2, further comprising a coupler configured to maintain the boost air passage in engagement with the inlet.

6. The system of claim 1, wherein the first section directly couples the coalescer exhaust passage to the crankcase.

7. The system of claim 1, where the coalescer exhaust passage further includes a third section directly coupling the coalescer exhaust passage to the muffler and having a third diameter, with the second section arranged between the first section and the third section and with the third diameter being larger than the second diameter.

8. The system of claim 7, wherein the second section includes a first end transitioning from the first diameter at the first section to the second diameter, and a second end transitioning from the second diameter to the third diameter at the third section.

9. The system of claim 8, wherein the second section includes a straight portion extending between the first end and the second end, with the straight portion having the second diameter and with the inlet formed at the straight portion.

10. A method, comprising:
    flowing blowby gases from a crankcase of an engine to a coalescer;
    forming coalescer exhaust from the blowby gases;
    flowing the coalescer exhaust from the coalescer to a muffler via a coalescer exhaust passage; and
    increasing a flow speed of the coalescer exhaust through the coalescer exhaust passage via a motive fluid received at an inlet of the coalescer exhaust passage upstream of the muffler, wherein the coalescer exhaust passage includes a first section, a second section, and a third section, with the second section arranged between the first section and the third section and having a diameter less than each of a diameter of the first section and a diameter of the third section, and wherein increasing the flow speed of the coalescer exhaust includes flowing the motive fluid directly to the second section.

11. The method of claim 10, wherein the motive fluid includes boost air flowing from a compressor.

12. The method of claim 10, wherein flowing the coalescer exhaust from the coalescer to the muffler includes flowing the coalescer exhaust through the first section into the second section, then flowing the coalescer exhaust through the second section and into the third section, and then flowing the coalescer exhaust through the third section and into the muffler.

13. A system, comprising:
    a coalescer defining a coalescer exhaust passage that fluidly couples to a muffler, including:
       a first section configured to receive coalescer exhaust from the coalescer at a lower, first speed;
       a second section configured to flow the coalescer exhaust from the first section to the muffler at a higher, second speed; and
       a compressor fluidly coupled to the second section via a boost air passage, the compressor configured to flow boost air to the second section via the boost air passage, the boost air passage including an extension extending into an interior of the second section and bending within the second section to align with a flow direction of the second section, and outlet of the boost air passage in a center of the second section.

14. The system of claim 13, wherein the first section and the second section have a different diameter or length.

15. The system of claim 13, wherein the first section tapers by a first amount to a joint between the first section to the second section, and the second section tapers by a second amount from the joint.

16. The system of claim 13, wherein the first section and the second section are coupled at a joint, and where a diameter of the coalescer exhaust passage at the joint is greater than a diameter of the first section or a diameter of the second section.

17. The system of claim 13, wherein the coalescer exhaust passage includes an inlet to flow boost air to the coalescer exhaust passage, wherein the coalescer exhaust passage includes a first section having a larger, first diameter and a second section having a smaller, second diameter, with the inlet formed at the second section.

18. The system of claim 17, wherein the coalescer exhaust passage further includes a third section arranged downstream of the second section and directly coupled to the muffler, with the third section configured to flow a mixture of the coalescer exhaust and the boost air from the second section to the muffler.

* * * * *